(12) United States Patent
Cooper et al.

(10) Patent No.: US 11,831,541 B2
(45) Date of Patent: Nov. 28, 2023

(54) CONTROLLER, COMPUTER PROGRAM AND METHOD

(71) Applicant: Sony Corporation, Tokyo (JP)

(72) Inventors: Richard Cooper, Basingstoke (GB);
Jian-Rong Chen, Shinfield (GB);
Robert Mark Stefan Porter,
Winchester (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/123,367

(22) Filed: Dec. 16, 2020

(65) Prior Publication Data
US 2021/0194799 A1 Jun. 24, 2021

(30) Foreign Application Priority Data
Dec. 18, 2019 (GB) ...................................... 1918743

(51) Int. Cl.
| | | |
|---|---|---|
| *G06F 15/173* | (2006.01) |
| *H04L 45/00* | (2022.01) |
| *H04L 45/24* | (2022.01) |
| *H04L 45/02* | (2022.01) |
| *H04L 45/42* | (2022.01) |

(52) U.S. Cl.
CPC .............. *H04L 45/38* (2013.01); *H04L 45/02* (2013.01); *H04L 45/24* (2013.01); *H04L 45/42* (2013.01)

(58) Field of Classification Search
CPC ......... H04L 45/38; H04L 45/02; H04L 45/42; H04L 45/24
USPC .......................... 709/238, 220, 222, 223, 224
See application file for complete search history.

(56) References Cited

U.S. PATENT DOCUMENTS

| | | | | |
|---|---|---|---|---|
| 6,397,359 | B1 * | 5/2002 | Chandra ................. | H04L 43/50 709/224 |
| 7,299,038 | B2 * | 11/2007 | Kennedy ................. | H04L 45/14 455/422.1 |
| 7,848,337 | B1 * | 12/2010 | Weng ...................... | H04L 45/00 709/224 |
| 8,995,438 | B2 * | 3/2015 | Latvakoski ........... | H04W 40/08 455/403 |
| 10,581,736 | B1 * | 3/2020 | Choudhury ......... | H04L 43/0876 |
| 2005/0013594 | A1 * | 1/2005 | Eagan ................ | H04N 21/8456 379/1.02 |
| 2005/0238024 | A1 | 10/2005 | Taylor et al. | |
| 2006/0159020 | A1 * | 7/2006 | Porat ................... | H04L 41/0856 370/235 |
| 2008/0205282 | A1 * | 8/2008 | Huang ................... | H04L 45/22 370/237 |
| 2016/0234099 | A1 * | 8/2016 | Jiao ........................ | H04L 45/02 |
| 2016/0315855 | A1 | 10/2016 | Chen et al. | |
| 2020/0036577 | A1 * | 1/2020 | Bhagvath ................ | H04L 45/58 |
| 2020/0336230 | A1 * | 10/2020 | Henderson ......... | G06Q 30/0277 |

\* cited by examiner

*Primary Examiner* — Lan Dai T Truong
(74) *Attorney, Agent, or Firm* — Oblon, McClelland, Maier & Neustadt, L.L.P.

(57) ABSTRACT

A method of managing a computer network in a production environment is described. The method comprises:
  identifying the endpoints to be used on the computer network during a time period; and
  at least a predetermined time prior to the commencement of the time period, the method comprises:
  running a flow routing algorithm for the computer network having the identified endpoints.

14 Claims, 12 Drawing Sheets

Priorities

| Name | |
|---|---|
| Critical | Delete |
| High | Delete |
| Medium | Delete |
| Low | Delete |
| Enter Name... | Add |

FIG. 4A

Categories

| Category | Priority | |
|---|---|---|
| Broadcast | Critical ▽ | Delete |
| Live Video | High ▽ | Delete |
| Offline Editing | Medium ▽ | Delete |
| Monitor | Medium ▽ | Delete |
| Informational | Low ▽ | Delete |
| Enter Name... | ▽ | Add |

FIG. 4B

Policies

| Priority | Redundancy Policy | Replacement Policy |
|---|---|---|
| Critical | Full Redundancy ▽ | Always Maintain Full ▽ |
| High | Failover (Shared Pool) ▽ | Maintain Pool (Displace low priority) ▽ |
| Medium | Failover (Best Effort) ▽ | Displace low priority ▽ |
| Low | Failover (Best Effort) ▽ | No Displace ▽ |

FIG. 4C

Network Flow

| Flow | Source | Destination | Category |
|---|---|---|---|
| 1 | Switcher 1 | Broadcast Out | Broadcast Stream ▽ |
| 2 | Switcher 2 | VTR 1 | Broadcast Stream ▽ |
| 3 | Cam 1 | Switcher 1 / Input 1 | Live Video ▽ |
| 4 | Cam 2 | Switcher 2 / Input 1 | Live Video ▽ |
| 5 | Cam 3 | Switcher 3 / Input 1 | Live Video ▽ |
| 6 | Cam 1 | Edit Suite 1 / Source 1 | Offline Editing ▽ |
| 7 | Cam 2 | Edit Suite 1 / Source 2 | Offline Editing ▽ |
| 8 | Switcher 1 | Green Room Monitor | Monitor ▽ |
| 9 | Switcher 1 | Monitor in Reception | Informational ▽ |

Tues 9 Nov

| 09:00 | 10:00 | 11:00 |
|---|---|---|
| Programme 1 | Programme 1 | Empty |

Weds 10 Nov

| 09:00 | 10:00 | 11:00 |
|---|---|---|
| Empty | Programme 2 | Programme 2 |

Programme 1

Device

Cam 1, Switcher 1...   - Require

Cam 2, ...   - Optional

Programme 2

Device

Cam 3   - Require

Switcher 1   - Optional

FIG. 7A

Day 1

CONTROLLER, COMPUTER PROGRAM AND METHOD

BACKGROUND

Field of the Disclosure

The present technique relates to a controller, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In media networks (such as a professional media network), redundancy is used to provide an alternative route through the network should a network interface, link or device (such as a switch or router) fail during operation. Redundancy is required in professional media networks due to the requirement to transport content reliably around the network.

At present, this redundancy is achieved by duplicating the whole network fabric. In other words, each endpoint within the network has two access interfaces (one access interface for the primary network and one for the secondary network). Each of the duplicate data streams produced by the access interfaces are then routed over two separate networks or over two separate routes through the network. These networks or routes share no switches or links. Accordingly, if a switch or link fails, the data stream on the unaffected route or network remains continuous.

Whilst this is completely resilient to failure, the cost of providing such redundancy is very high. Moreover, the complexity of such redundancy provision is very high. Therefore, the costs (both financially and in management terms) are considerable as two networks need to be installed and operated in parallel.

It is an aim of the disclosure to address the issue of reducing the cost of operating a network whilst ensuring that there is sufficient redundancy to deal with a failure within the network.

SUMMARY

According to embodiments of the disclosure, there is provided a method of managing a computer network in a production environment, comprising: identifying the endpoints to be used on the computer network during a time period; and at least a predetermined time prior to the commencement of the time period, the method comprises: running a flow routing algorithm for the computer network having the identified endpoints.

Features of the disclosure are provided in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 4A to 4D show an interface for the controller according to embodiments of the disclosure;

FIGS. 7A, 7B and 7C show examples of using the controller of FIG. 6

DESCRIPTION OF THE EMBODIMENTS

Figure 1:
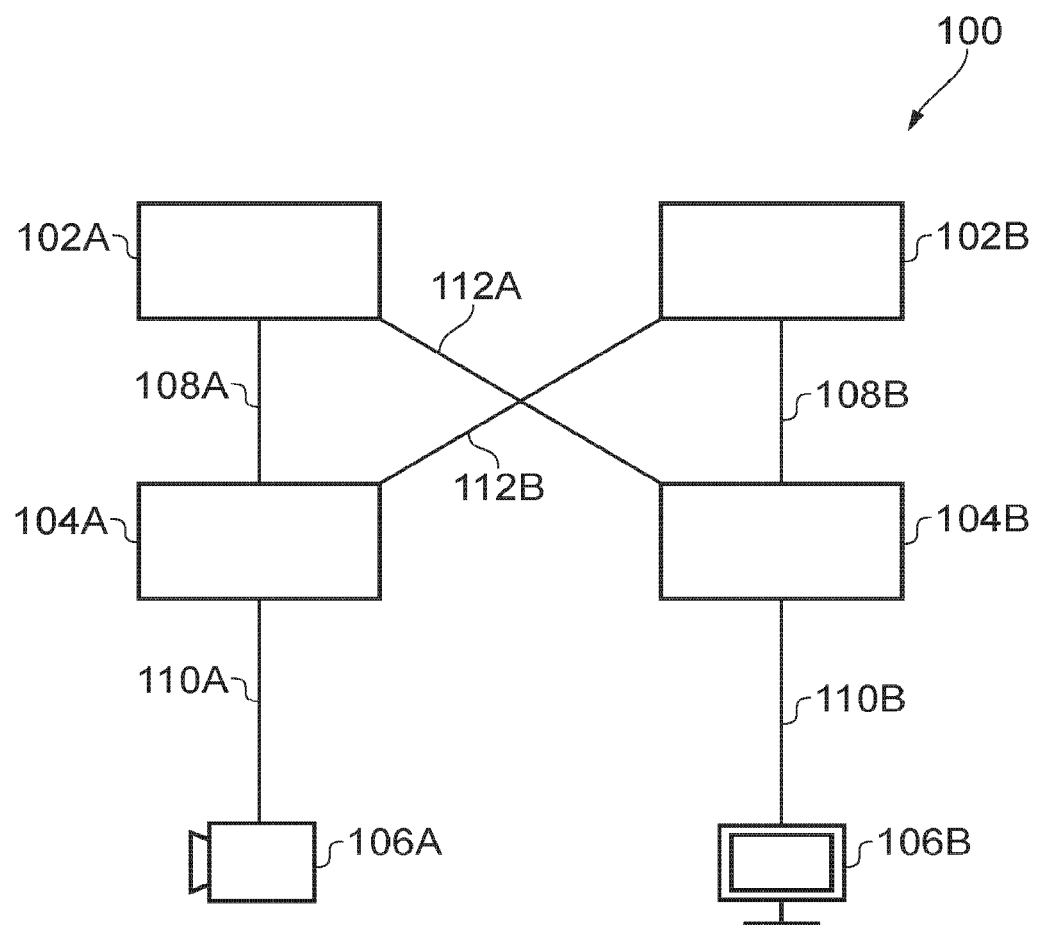
FIG. 1 shows a leaf-spine network in a media network.

Referring now to the drawings, wherein like reference numerals designate identical or corresponding parts throughout the several views.

FIG. 1 shows a leaf-spine network in a media network. A leaf-spine network typically includes spine switches 102A and 102B and leaf switches 104A and 104B. A spine switch 102A and 102B is a piece of network fabric that handles inter-leaf traffic. A leaf switch 104A and 104B connects to endpoint devices (which are sometimes referred to a device, Media Node or host or similar) and sends the traffic between the endpoint device and the core network via the spine switch 102A and 102B. In the example of Figure the endpoint devices are a camera 106A and a monitor 106B. However, as would be appreciated, any end point device is envisaged such as a switcher, microphone or any kind of appropriate device.

The endpoint device connects to the leaf switch using an access link 110A and 110B. Specifically, the access link 110A and 110B connects to the endpoint device using a network interface and connects to the leaf switch 104A and 104B using an access port. The leaf switch 104A and 104B connects to the spine switch 102A and 102B using trunk links 108A, 108B, 112A and 112B. Specifically, the trunk links 108A, 108B, 112A and 112B connect using trunk ports located in the leaf switch 104A and 104B.

First Embodiment

Figure 2:
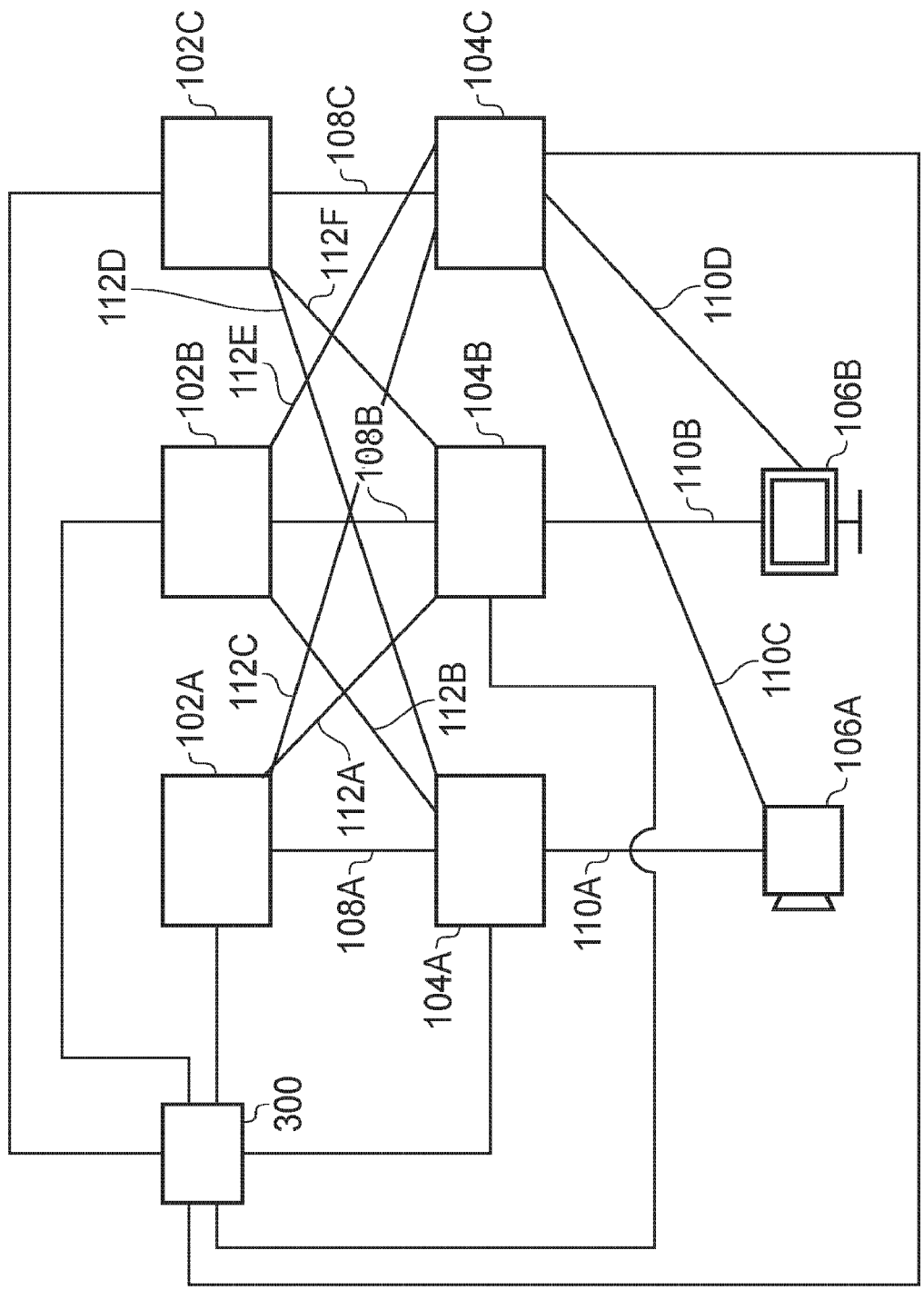
FIG. 2 shows a network according to embodiments of the present disclosure.

FIG. 2 shows a network according to embodiments of the present disclosure. As would be appreciated, the network of FIG. 2 is a leaf-spine network. However, the disclosure is not so limited and embodiments of the disclosure can be applied to any kind of computer network topology such as a mesh topology, star topology or the like.

In the network of FIG. 2, an additional spine switch 102C and an additional leaf switch 104C is included. As would be appreciated, in the known full duplicate network, a second additional spine switch and a second additional leaf switch would need to also be included. In other words, in the known full duplicate network two additional spine switches and two additional leaf switches would be required. However, in the network of this embodiment, only one additional spine switch 102C and one additional leaf switch 104C is required.

This reduces the cost and complexity of implementing redundancy in a computer network.

The additional spine switch 102C is connected to each leaf switch 104A, 104B and 104C using trunk links 108C, 112F and 112D. Further, the additional leaf switch 104C is connected to each endpoint device 106A and 106B using access links 110C and 110D respectively. In this case, each endpoint 106A and 106B is connected to two access ports by two network interfaces. However, in other embodiments, one or both of the endpoints 106A and 106B may only be connected to one access port. In this case, the level of redundancy within the network would be less as each endpoint is connected to only one leaf switch. However, the level of redundancy between the leaf switches and the spine switches would be the same.

Each of the spine switches 102A, 102B and 102C, and leaf switches 104A, 104B and 104C are connected to, and controlled by, a controller 300. In embodiments, the controller 300 is a Software Defined Network (SDN) Controller 300, although the disclosure is not so limited. The controller 300 according to embodiments of the disclosure is described with reference to FIG. 3.

Figure 3:
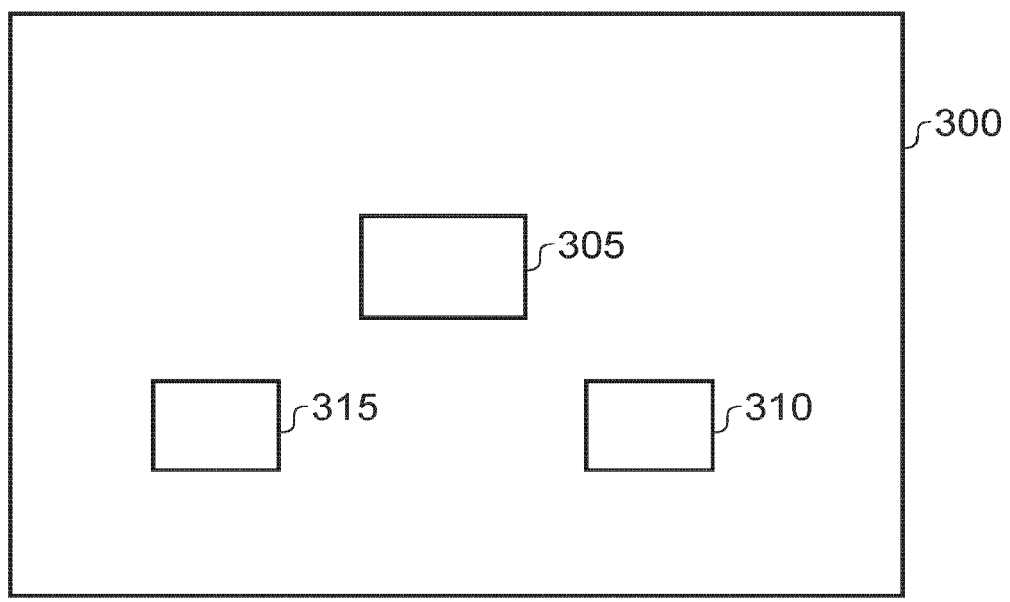
FIG. 3 shows a diagram of a controller according to embodiments of the disclosure.

FIG. 3 shows a diagram of the controller 300 according to embodiments of the disclosure. The controller 300 comprises processing circuitry 305. The processing circuitry 305 is circuitry that operates under the control of software code. The software code is stored within storage 310. The storage 310 may be any kind of storage that is capable of storing software code therein or thereon such as solid state storage or magnetically or optically readable storage. The software code configures the controller 300 to perform methods according to embodiments of the disclosure.

Additionally provided in the controller 300 is communication circuitry 315. The communication circuitry 315 communicates with each of the spine switches 102A, 102B and 102C and leaf switches 104A, 104B and 104C. This communication may be over an Ethernet link, wireless link or other link as would be appreciated.

As noted above in relation to FIG. 2, the redundancy provided in a network according to embodiments of the disclosure is less than provided in a known manner. In other words, in a network according to embodiments of the disclosure, the level of redundancy provided within the network is less than duplicating the network. However, it is important to note that the level of redundancy within the network according to FIG. 2 provides sufficient resilience for the network whilst ensuring that significant over provisioning of resource that increases the cost and complexity of the network does not occur.

In order to provide sufficient resilience for each data traffic flow being transmitted over the computer network, a method of managing a computer network is provided. This method comprises identifying a characteristic of data traffic being sent over the computer network; and applying a policy to at least part of the network, the policy defining the operation of at least part of the network in event of a failure within the network being defined on the basis of the characteristic.

In other words, the method of managing the network having less than duplicate redundancy identifies a characteristic of the data traffic over the network, and then on the basis of the characteristic, a policy is applied to part or all of the network that defines the operation of the part of or all of the network in the event of a failure. By applying a policy in this manner means that the network can provide sufficient resilience with less than duplicate redundancy. The characteristic of data traffic may be intrinsic to a physical property of the data traffic such as the bandwidth required, a property of the data traffic itself such as a frame rate of video content contained within the data traffic, the type of data traffic such as audio or video data traffic or a semantic meaning of the data traffic such as source or destination of the data traffic or the relative importance to the operation of a studio or the like of the data traffic.

This will be explained with reference to FIGS. 4A to 4D and FIG. 8.

FIG. 4A to 4D shows an interface for the controller according to embodiments of the disclosure. In FIG. 4A a list of priorities to be applied to the various types of data traffic (which may be referred to as data traffic flows later) sent over the computer network is shown. In particular, there is shown four levels of priority that may be applied to the various types of data traffic flows. In embodiments, data traffic flows are streams of related network data that are routed from and to the same endpoints, for example. This may include audio and/or video signals in non-limiting embodiments. These are critical priority, high priority, medium priority and low priority. There is also the option of deleting the priority should a user choose to do so. Additional priority levels may be added as well. As would be appreciated, therefore, although four levels of priority are shown, the disclosure is not so limited and any number of levels of priority, whether pre-defined or user configurable, is envisaged.

FIG. 4B shows a list of categories (based on characteristics) to which each of the data traffic flows may be assigned. For each category of data traffic flows, a priority is assigned. The priority associated with each category is dependent upon the criticality of that category of data traffic flow within a particular network. In other words, the priority associated with each category is dependent upon the amount of data loss and delay in recovering from a failure that the operator of the network can withstand before the operation of the network becomes significantly impacted by a failure in at least part of the network.

So, in a media network (such as within a professional or semi-professional broadcaster), the priority is assigned based on the criticality of the data traffic flow to the broadcaster. For example, where it is critical that no data is lost and recovery is immediate, in the event of a failure, the data traffic flows having that characteristic are provided a critical priority rating. Where the loss of a few packets of data or a recovery delay of a few frames of video would not significantly impact the broadcaster, the data traffic flows having that characteristic are provided a high priority rating. In the event that a longer disruption (for example of tens of frames or a few seconds) in the provision of the video would not significantly impact the broadcaster, the data traffic flows having that characteristic are provided a medium priority rating. Finally, in the event that the complete loss of the data flow would not significantly impact the broadcaster, the data traffic flows having that characteristic are provided a low priority rating.

In embodiments of a media network, live broadcast data traffic flows might be assigned a critical priority, live video might be assigned a high priority, audio/video data for offline editing and for associated monitors might be assigned a medium priority, and informational data (such as current weather or the like) might be provided a low priority. Of course, the assignment of the priority level to a particular category of data traffic flows may be made by the user of the controller 300. In this instance, the priority level associated with each category may be changed by using a drop down menu as shown in FIG. 4B. Moreover, the user may define further categories of data traffic flows and may assign a priority as appropriate. Additionally, if required, the category of data traffic flows may be deleted. Accordingly, although 5 categories of data traffic flows are shown the disclosure is not so limited and any number of categories is envisaged.

In the embodiments of FIG. 4C, a list of policies for at least part of the network in the event of a failure is shown. In particular, for each priority level there is a redundancy policy and a replacement policy. These policies, in embodiments, are implemented by controller 300. However, it is envisaged that the controller 300 may provide these policies to the spine switches 102A and 102B and/or the leaf switches 104A and 104B when set so that the spine switches and/or the leaf switches may implement the appropriate policy in the event of a failure. In some embodiments, for example, the policies may configure the leaf and/or spine switches to automatically update their forwarding tables when a failure is detected. This will allow the policy to be implemented quickly within the network which is particularly useful for data traffic flows having a high or critical priority where rapid failover to avoid delay or loss of data traffic flows. In other words, the policy may be implemented automatically in the leaf and/or spine switches meaning that the controller 300 does not need to intervene when failover occurs.

The redundancy policy defines how redundant capacity should be allocated during normal operation, as well as the method of failover should a failure occur. In embodiments, data traffic flows with a critical priority are allocated two completely separate, active, end-to-end routes (so-called "Full Redundancy"); high priority data traffic flows are allocated one active route, with an amount (which may be a predetermined portion of redundant bandwidth within the network) of reserved failover bandwidth which is shared with other data traffic flows having a high priority (so called "Failover (shared pool)"). Of course, these are only examples of how redundant capacity may be allocated and other policies are envisaged. Specifically, a network administrator may allocate different redundancy policies based on the requirements of the network.

It will be appreciated that immediately after recovery from a failure, the redundancy of the network will have been reduced. Thus, the replacement policy defines how, in the event of a failure and subsequent recovery, the network bandwidth should be re-assigned after recovery. In embodiments, if one of the two active routes for a data traffic flow having a critical priority fails, a new active secondary route is allocated by using redundant bandwidth reserved for data traffic flows having a lower priority. In other embodiments, the data traffic flows will share the remaining pool of redundant bandwidth within the network. In other embodiments, low priority data traffic flows will be dropped to free bandwidth within the network. Of course, these are only examples of how redundant capacity may be allocated and other policies are envisaged. Specifically, a network administrator may allocate different replacement policies based on the requirements of the network.

Although the above describes policies being applied to data traffic flows, separate policies may be applied to any one or more of the access links, leaf switches, trunk links or spine switches.

In the specific interface shown in FIG. 4C, the data traffic flow having a critical priority has a redundancy policy of "Full Redundancy" and a replacement policy of "Always Maintain Full Redundancy". This maintains seamless, lossless failover for the data traffic flow having critical priority.

The data traffic flows having a high priority have a redundancy policy of "Failover (Shared Pool)" and a replacement policy of "Maintain Pool (displace low priority)". The data traffic flows having a medium priority have a redundancy policy of "Failover (best effort)" and a replacement policy of "Displace Low Priority" and the data traffic flows having a low priority have a redundancy policy of "Failover (best effort)" and a replacement policy of "No Displace".

These redundancy policies and replacement policies will now be described.

"Full Redundancy"—this uses two active routes which share no links or switches. In other words, this achieves the same effect as the known duplicate network. However, unlike the known scenario, this policy is only applied to data traffic flows that the network administrator considers necessary. This reduces the cost and management of a computer network compared to the known technique.

"Always Maintain Full Redundancy"—this maintains the full redundancy for the data traffic flow by replacing a failed route with a new redundant route in the event of failure. In the event that insufficient capacity is available to achieve this, one or more other data traffic flows having a lower priority (such as low priority data traffic flows) may be removed to provide the required capacity. In other policies, the second route may be defined but not implemented to carry the critical data traffic flow until there is a failure in the other original data traffic flow route. This policy is also an improvement on some embodiments of the known technique, in which a loss of redundancy would be incurred after recovery from a failure.

"Failover (Shared Pool)—this allocates a predetermined portion of redundant bandwidth within the network to data traffic flows having this priority. This reserve is shared with other data traffic flows having the same priority level.

"Maintain Pool (Displace Low Priority)"—in the case of a "Shared Pool" redundancy policy, this replacement policy maintains the amount of bandwidth allocated to the pool by removing data traffic flows having a lower priority in the event of failures. The mechanism for choosing which data traffic flow to displace may include blocking data traffic flows to a specific endpoint or may include reducing the bandwidth given to all or a subset of the low priority data traffic flows, or by taking capacity from lower priority shared redundancy pools.

"Failover (Best Effort)"—this allocates as much available redundant bandwidth as possible to the data traffic flow having this priority level. In other words, there is no predetermined portion of the redundant bandwidth reserved for these data traffic flows. In this instance, the amount allocated to the data traffic flow may be less than the predetermined portion.

"Displace Low Priority"—in the event of failure, this policy removes data traffic flows having a lower priority, but only when the failure occurs, not pre-emptively. This is a weaker policy than "Maintain Pool (Displace Low Priority)"—removing the lower priority data traffic flows after the failure has occurred will increase the recovery time, but will allow the lower priority flows to operate in the event of no failure. As noted above, the mechanism for choosing which data traffic flow to displace may include blocking data traffic flow to a specific endpoint or may include reducing the bandwidth given to all or a subset of the low priority data traffic flows.

"No displace"—this does not remove any other data traffic flows to ensure redundancy for a particular priority of data traffic flow.

It is envisaged that the network administrator will set the redundancy policy and the replacement policy for each priority of data traffic flows. This will be achieved by selecting the policy from a predefined set of policies set in advance using a drop down menu or the like.

The policies noted above are more examples. Other policies of variations of the policies are envisaged. In embodiments, the user of the controller 300 chooses from a set of policies that have been implemented in the system. This set of policies may be all or a subset of those envisaged above.

FIG. 4D shows an interface for the network flow within the network.

In FIG. 4D, the source endpoint and the destination endpoint are defined in association with a network flow. The category of data stream which is sent from the source endpoint to the destination endpoint is then defined in the category column. As will be apparent, the category of data stream is defined in the table of FIG. 4B. The category of the data traffic flows will be selected by the network administrator from a drop-down list of categories defined in the table of FIG. 4B.

As will be appreciated, the interfaces of FIGS. 4A to 4D use drop down lists. However, the disclosure is not so limited and any kind of suitable interface is envisaged.

According to a process 1-0 of the first embodiment, a number of steps are performed.

In step 1-1, a characteristic of a data traffic flow being sent over the computer network is identified. The process then moves to step 1-2 where a policy is applied to at least part of the network, the policy defining the operation of at least part of the network in event of a failure within the network and being defined on the basis of the characteristic of the data traffic flow.

Figure 8:
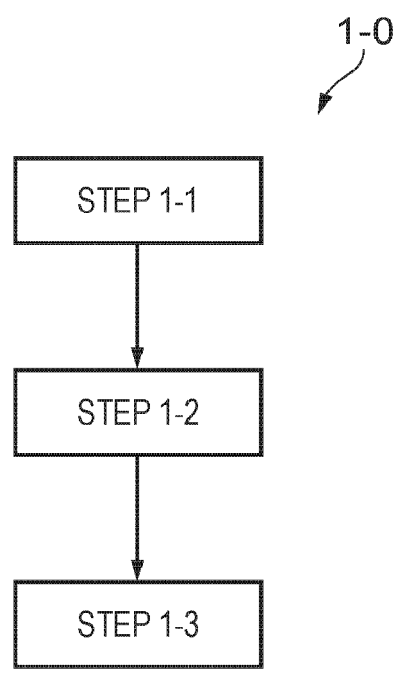
FIG. 8 shows a flow chart describing the process of the first embodiment.
Figure 9:
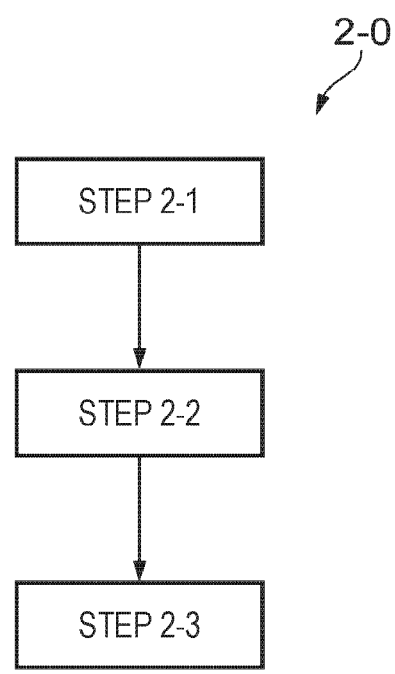
FIG. 9 shows a flow chart describing the process of the second embodiment.

The process then moves to step 1-3 where the process ends. This is shown in FIG. 8.

Second Embodiment

In computer networks (sometimes called fabric networks), a computer network may be described as blocking, re-arrangeable non-blocking or full non-blocking.

In blocking networks, there is not enough bandwidth within the network to carry the theoretical maximum access data traffic. If all connected endpoints were to try and use their theoretical maximum data traffic flow bandwidth at the same time, data traffic would be dropped, or the controller of the network would restrict the bandwidth or deny data traffic flow.

In re-arrangeable non-blocking networks, there is enough bandwidth for all connected endpoints to transmit or receive the data traffic at maximum bandwidth for at least some configurations of routes through the network. However, for some configurations of routes, full bandwidth will not be possible. This means that with a set of existing routes, some routes may need to be changed (or re-arranged) in order to add more routes whilst still maintaining the non-blocking property.

In a strict non-blocking network, there is enough bandwidth for all connected endpoints to receive and transmit to all other connected endpoints at full bandwidth no matter which order the network routes are added or removed from the network. In addition, no matter how existing data traffic is being routed, new routes can be added whilst still maintaining the non-blocking property.

As will be appreciated, a full non-blocking network requires a large amount of over provisioning within the network compared with an equivalent re-arrangeable non-blocking network. This makes a full non-blocking network very expensive.

Additionally, in a network that uses User Datagram Protocol (UDP), such as a media network, it is not possible to change the routes of data traffic flows that are actively in use as this would affect a live broadcast. Therefore, in this situation, if the network is arranged as a re-arrangeable non-blocking network fabric, but as the network cannot be re-arranged, when a new data traffic flow is requested (such as the addition of a new endpoint), the data traffic flow is refused because there is not enough bandwidth to enable the data traffic flow to be made and the routes on the network cannot be changed.

In other words, the probability of a new network traffic flow being thus refused in a re-arrangeable non-blocking network varies from 0% (full non-blocking) to 100% depending on the over-provisioning of the network, and an acceptable probability depends on a particular business case. In general, the 0% probability of the full non-blocking case is prohibitively expensive, and the lower the probability, the higher the cost of the network fabric.

It is an aim of the second embodiment to address this issue.

Figure 5:
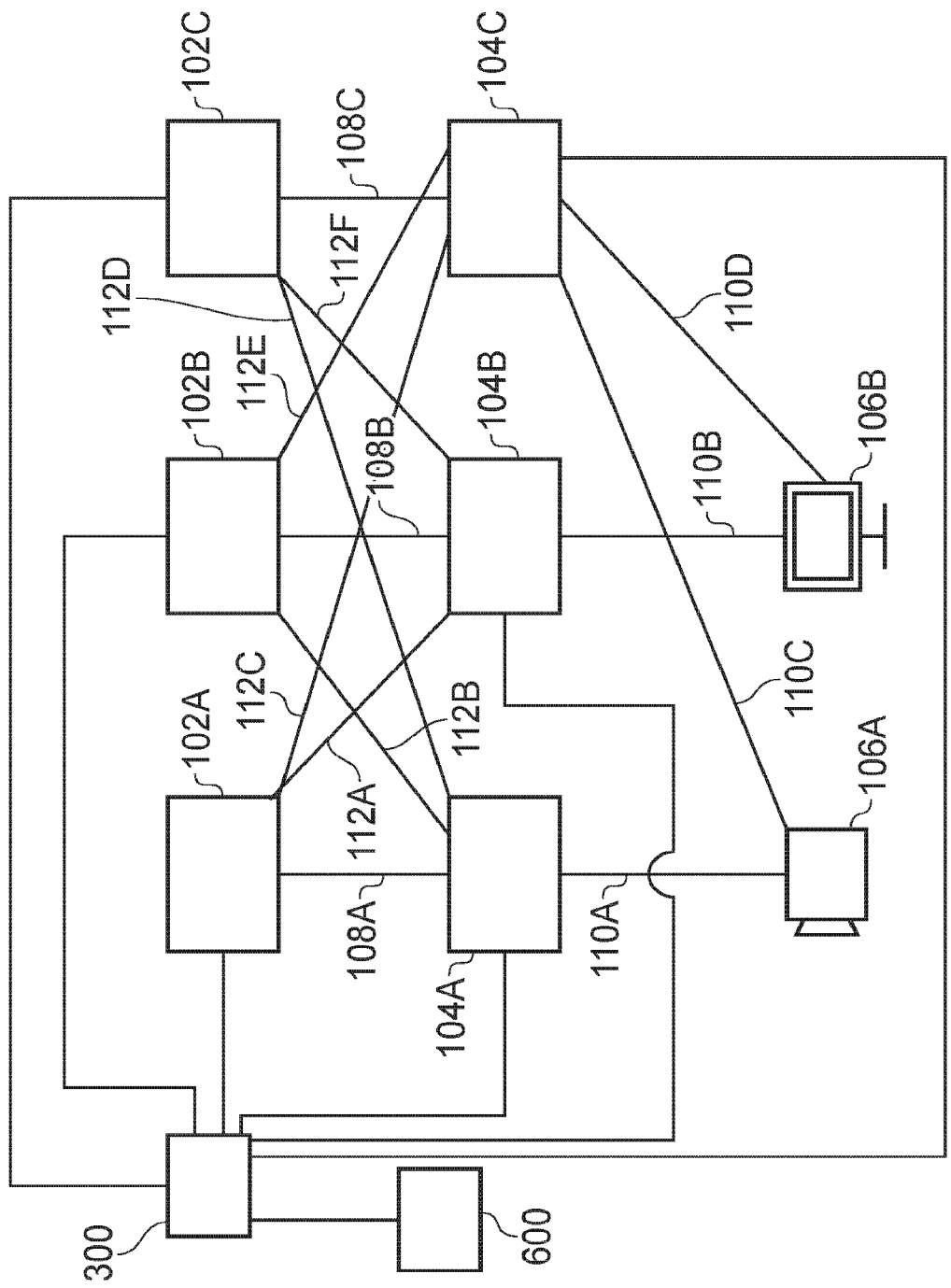
FIG. 5 shows a network according to other embodiments of the disclosure.

Referring to FIG. 5, a second embodiment of the disclosure is shown. As will be apparent, the second embodiment of FIG. 5 contains many of the same features as FIG. 2. In this instance, like numerals refer to like features. In FIG. 5, however, there is a facilities management system 600 in communication with the controller 300. Although shown separately to the controller 300, in embodiments, the facilities management system 600 may be integrated into the controller 300.

In embodiments of the disclosure the facilities management system 600 is a studio facilities management system. The studio facilities management system manages schedules of a studio (or all or a subset of studios) within a facility. In this regard, the facilities management system manages the schedule of each endpoint within a particular studio or studios within a facility. This is because facilities management systems manage the inventory located within a studio to ensure that the correct equipment is provided to the studio at the correct time. The setup of the studio and the purpose of each endpoint within the studio is also known within the facilities management system. Of course, although studio is mentioned hereinafter, a studio is merely an example of a production environment or facility as would be appreciated by the skilled person.

Typically, the bookings within a facilities management system 600 are made well in advance of the booking. This allows the studio to be correctly equipped.

Accordingly, as the endpoints, and the purpose of each endpoint, within the facilities management system are defined in advance of the booking, the facilities management system 600 may therefore define the network flows of FIG. 4D. Accordingly, the facilities management system 600 may embody the disclosure described with reference to FIGS. 2 to 4D.

However, the facilities management system 600 may also be used without including the embodiments described with reference to FIGS. 2 to 4D. In this instance, the controller 300 may be a known controller of computer network such as an SDN. This particular case will now be described with reference to FIGS. 5 to 7.

Figure 6:
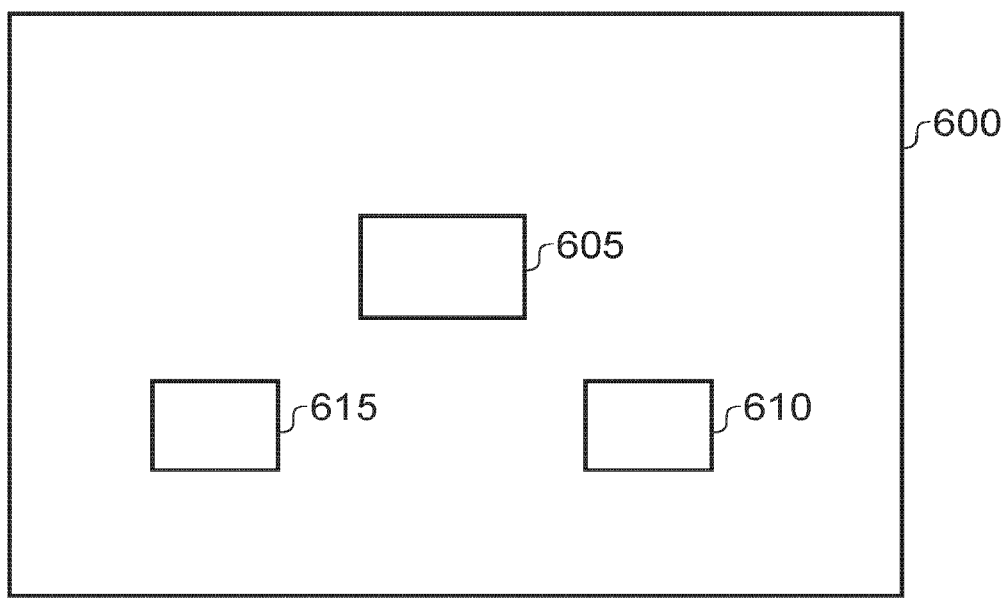
FIG. 6 shows a facilities management controller according to embodiments of the disclosure.

FIG. 6 shows a diagram of a facilities management system 600 according to embodiments of the disclosure.

The facilities management system 600 comprises processing circuitry 605. The processing circuitry 605 is circuitry that operates under the control of software code. The software code is stored within storage 610. The storage 610 may be any kind of storage that is capable of storing software code therein or thereon such as solid state storage or magnetically or optically readable storage. The software code configures the facilities management system 600 to perform methods according to embodiments of the disclosure.

Additionally provided in the facilities management system 600 is communication circuitry 615. The communication circuitry 615 communicates with the controller 300. This communication may be over an Ethernet link, wireless link or other link as would be appreciated.

A screenshot 700 from a facilities management system 600 according to embodiments is shown in FIG. 7. The screenshot shows the use of a studio during a time period. In the example of FIG. 7, the time period is embodied as time slots on two different dates. The times slots are 09:00 to 11:00 and the dates are Tuesday 9 November and Wednesday 10 November. Of course, the disclosure is not so limited to such time periods and other time periods are envisaged.

On Tuesday 9 November, at 09:00 Programme 1 is being recorded. Programme 1 continues to be recorded at 10:00 and is scheduled to be finished recording at 11:00. Specifically, at 11:00, the studio is scheduled to be empty. This means that during the period 09:00 to 11:00, the studio will be occupied by studio equipment and the computer network servicing the studio will be operational. However, at 11:00 when the studio is scheduled to be empty, the computer network will be non-operational.

On Wednesday 10 November, at 09:00 the studio is scheduled to be empty. This means that during this empty time, the computer network will be non-operational. However, at 10:00 and 11:00, programme 2 is scheduled to be recorded and so the computer network servicing the studio will be operational.

Additionally shown in FIG. 7 is a list of studio equipment (inventory) used during the recording of programme 1 and 2. This inventory is determined by the producer of the programme being recorded. In some instances, the producer will identify required equipment (which will be endpoints on the network) such as a minimum number of cameras and network switchers. This required equipment will require connection to the computer network. In other instances, the producer may identify optional equipment such as further cameras or switchers which the producer may use but which may not ultimately be required during the production. Therefore, initially, the optional equipment is not connected (or at least connected but not using the network) to the network but the optional equipment may be added to the network during the recording of the production. As noted above, this may not be permitted due to bandwidth constraints on the network. It is also possible that unplanned equipment might be required to be added to the network during the recording of the production. As noted above, this may not be permitted due to bandwidth constraints on the network.

Figure 7B:
Figure 7B:
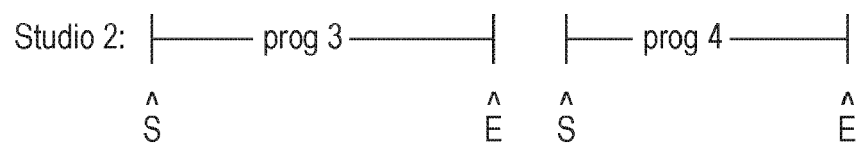
Figure 7B:
Figure 7B:
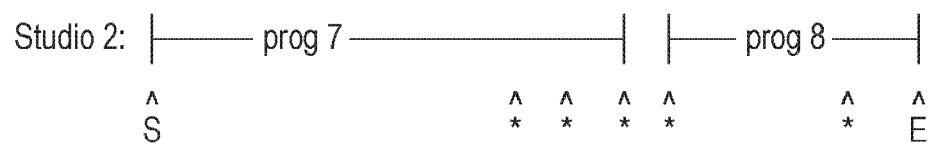

FIG. 7B shows another explanation of embodiments of the disclosure. In the case of day 1, studio 1 and studio 2 are recording programs prog 1, prog 2, prog 3 and prog 4 as indicated. In the case of day 2, studio 1 and studio 2 are recording programs prog 5, prog 6, prog 7 and prog 8 as indicated. Changes to routing are potentially required at the time points noted with carets (^) in FIG. 7B. In the example of FIG. 7B, the carets with no star (*) located underneath may be rearranged using the technique described above. However, the carets with a star located underneath indicate instances where routes must be added and/or removed without disrupting the existing routes. This means changes at these times must be planned in advance using embodiments of the disclosure.

In the example of day 2, changes to routing may be required to finish recording prog 5 and prepare for prog 6, but these changes must not affect any routes simultaneously in use by prog 7. A similar situation occurs at the transition between prog 7 and prog 8 whilst recording prog 6. It will be appreciated that in a large facility, a large number of transitions, and simultaneous programs may need to be accommodated.

The carets marked with an S (for Start) and E (for End) are time points marking the beginning or end of a period that falls under the scheduling according to embodiments. Outside of these times, routes may be changed freely.

Therefore, the period between Start to End (S to E) are identified, then for each S to E period, from the device/equipment requirements for the programme production, route changes required at each marked time point (^) are identified during the period. A brute force, simulation or other mechanism for calculating a sequence of routing changes will be carried out that maintains the non-blocking property without requiring re-arrangement of existing flows or route.

Figure 7C:
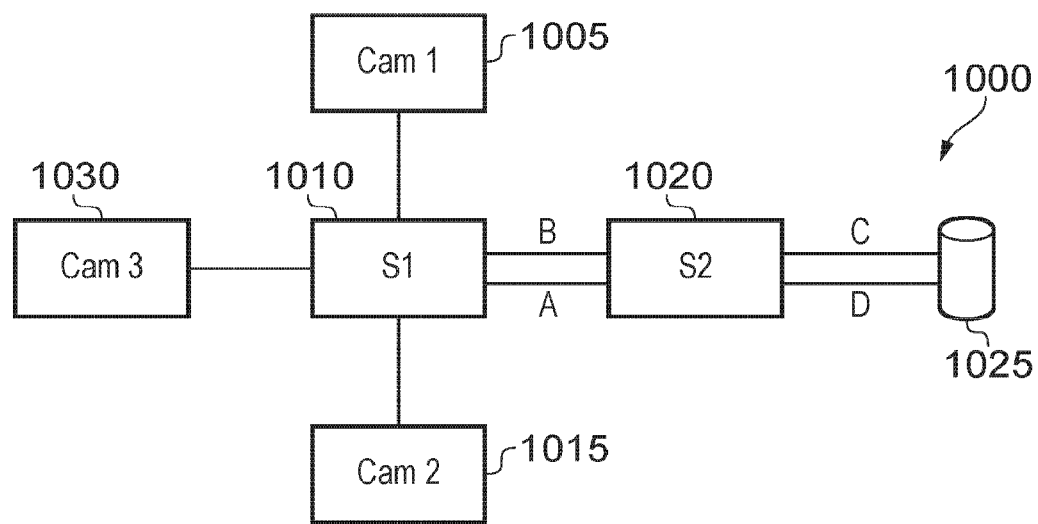

FIG. 7C shows a network arrangement 1000 that may be used to capture prog 7. The network arrangement 1000 comprises a first camera 1005 and a second camera 1015 each connected to a first switch 1010 over a 10 MB/s link. The first switch 1010 is connected to the second switch 1020 by two 10 Mb/s links A and B. The second switch 1020 is then connected to storage 1025 using two 10 Mb/s links C and D. The routes between the first switch 1010 and the second switch 1020 will be considered.

In the known art, at the beginning of Prog7 a typical network load balancing routing algorithm might assign the flow for the first camera 1005 to link A. In order to balance the network load, the algorithm might then assign the flow for the second camera 1015 to link B. Now Link A and Link B each carry 4 Mb/s of their 10 Mb/s capacity. This outcome would be typical for an algorithm that load balances routes incrementally with no consideration of the future schedule.

Now imagine that Prog 6 wants to record 4K video at 8 Mb/s from a third camera 1030 connected to the first switch 1010 to storage 1025. When Prog6 is due to start, it is impossible to route an extra 8 Mb/s on either Link A or Link B, without re-arranging the routes for the first camera 1005 or the second camera 1015. This is impossible for the duration of Prog7. The routing request is rejected and Prog6 cannot go ahead.

In the embodiment of the disclosure, the algorithm would identify the period S to E that covers Prog5, Prog6 and Prog7, and calculate a sequence of route changes over that whole period. Thus, even though the 'best' route at the start of Prog7 would be as described above, as the algorithm according to embodiments identifies the period S to E, the algorithm according to embodiments would instead choose to route the flows for both the first camera 1005 and the second camera 1010 via Link A. This means that until the beginning of Prog6 the arrangement would not be optimal for load balancing on the network, but at the beginning or Prog6 it would then be possible to use Link B for the 8 Mb/s flow from the third camera 1030. All programs can go ahead In existing solutions, in the event that optional equipment or unplanned equipment is added to the network, a flow routing algorithm (such as Dijkstra's Algorithm, or some other suitable algorithm) will be used to search for a route through the network fabric for use by that equipment. As noted above, in the case of a re-arrangeable non-blocking network, and where re-arrangement is not possible, this search might fail. In that case, the new flow would be refused.

In order to address this problem, in the second embodiment, information about the production recording schedule held by the facilities management system is used to plan, in advance, a schedule of network route re-arrangements. A flow routing algorithm is carried out in advance of the scheduled recording time of the programme. The flow routing algorithm may be a known deterministic algorithm, simulation technique or brute-force search.

In particular, information from the facilities management system will be used to identify time periods in the production recording schedule when the network in the studio is non-operational. At these times, network traffic flows may be re-arranged.

Additionally, information from the facilities management system will be used to identify time periods in the production recording schedule when the network in the studio is operating at reduced capacity. At these times, the flow routing algorithm will be able to add new flows with a reduced probability of rejection.

By performing the network re-arrangement algorithm in advance, and scheduling as many routing changes as possible at times when the network is non-operational, known time consuming network re-arrangement algorithms such as brute force algorithms are feasible. In other words, by performing a flow routing algorithm at least a predetermined time prior to the commencement of the time period the network is in use, a network rearrangement schedule for the computer having the identified endpoints (such as the devices shown in FIG. 7) can be determined.

In embodiments, the network rearrangement algorithm will be performed only on the required endpoints. In other words, the network rearrangement algorithm will only include the endpoints noted as being required by the facilities management system 700. However, of course, the disclosure is not so limited. In embodiments, the flow routing algorithm will additionally include one or more of those endpoints identified as optional in the facilities management system 700. This allows the producer of the programme being created the flexibility to connect optional endpoints to the network without risking the data traffic flow being blocked. In embodiments, the optional endpoints may be provided with an indication of the likelihood that the optional endpoint will be added to the network during the production of the programme. This indication may be determined by the type of programme being recorded. For example, in some productions, such as a television debate, it is more likely that an additional microphone is added to the network than, say, an additional camera. However, in other productions, such as a quiz show, an additional camera may be more likely than an additional microphone. In other instances, the indication may be determined by the producer of the programme. For example, one producer may regularly add an additional switcher when making a programme and may rarely add an additional microphone. Therefore, in this case, the likelihood of the producer adding a switcher is higher than the likelihood of the producer adding a microphone.

In embodiments, the flow routing algorithm may use the indication to prioritise the optional endpoints included in the flow routing algorithm. As noted above, flow routing algorithms typically require a large amount of resources. Therefore, in embodiments, the indication is used to reduce the number of endpoints contained in the algorithm whilst ensuring that the optional endpoints that are likely to be used are included. This reduces the amount of resources used by the flow routing algorithm whilst ensuring that the endpoints likely to be used are included in the algorithm.

In embodiments, the flow routing algorithm will arrange the routing of known equipment and optional equipment in such a way as to minimize the probability that the addition of unplanned equipment being added to the network being rejected at any given time.

In some instances, the period of time prior to commencement of the use of the network may not be sufficient to run the flow routing algorithm to include all the optional endpoints. In this instance, the flow routing algorithm including only optional endpoints having a likelihood of being used above a threshold value is included. This threshold value may be set according to the amount of time available to run the flow routing algorithm. In other words, if the amount of time will only allow two occurrences of the flow routing algorithm to be run, the flow routing algorithm including only required endpoints and those optional endpoints having a likelihood of use being greater than 90% may be run. This will allow the most likely endpoints to be included for a given time period available.

In instances, the flow routing algorithm may, in addition, be used to search for a solution that provides maximal flexibility for changes to the network (such as endpoints being added or removed from the network) during the programme production or shortly before the commencement of the programme production. In other words, the flow routing algorithm will find the best route at a given time, but to avoid rejection in embodiments, the flow algorithm takes into account the current state of the network, but also the planned (and potentially unplanned) future changes. Therefore, in the above example, the flow routing algorithm might apply a non-optimal route at 11 am because it has planned to make another route change possible at 11:15.

In embodiments, the facilities management system 600 will partition the schedule into periods of time when data traffic flows cannot be rearranged, and periods (perhaps instants) when they can. The facilities management system 600 will then schedule rearrangements for the latter periods in a way that allows any required routing changes during the former periods to be applied without rearrangement. If possible, this will also be achieved leaving as much opportunity as possible for predicted, or unplanned, additions.

Note also that the network may be shared between many studios and other facilities, so multiple programmes might be recorded at the same time and/or overlap.

Therefore, in embodiments, the time period that a given run of the flow routing algorithm covers is not a single program, but is a time period during which no rearrangements can occur. This may cover multiple overlapping programs.

According to a process 2-0 of the second embodiment, a number of steps are performed.

In step 2-1, the endpoints to be used on the computer network during a time period are identified. The process then moves to step 2-2 where at least a predetermined time prior to the commencement of the time period, a flow routing algorithm for the computer network having the identified endpoints is run. The process then moves to step 2-3 where the process ends.

In embodiments, in addition to step 2-1, periods or instants when re-arrangement may occur, and periods when it may not are identified. The flow routing algorithm may be run to find a set of acceptable route additions and removals for each of the non-rearrangement periods. In some instances, changes to the schedule might cause splits or joins of these periods which would then need to be re-calculated, or just cause the re-calculation of already identified periods.

In embodiments, in order to reduce the time for recalculation of the algorithm if the schedule changes, the processing circuitry 605 could also store a portion of the intermediate state of the algorithm which could be used as a starting point for any re-calculations.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A method of managing a computer network in a production environment, comprising:
   identifying the endpoints to be used on the computer network during a time period; and
   at least a predetermined time prior to the commencement of the time period, the method comprises:
   running a flow routing algorithm for the computer network having the identified endpoints.
2. A method according to clause 1, comprising: providing an indication of the likelihood that the identified endpoints will be added to the computer network during the time period.
3. A method according to clause 2, wherein the indication is based on the type of programme being produced in the studio or the identity of the producer of the programme.
4. A method according to any preceding clause, comprising: selecting the identified endpoints based upon the predetermined time.
5. A method according to any preceding clause, comprising: partitioning the time period into a plurality of sections during which the routes will not be rearranged.
6. A computer program product comprising computer readable instructions which, when loaded onto a computer, configures the computer to perform a method according to any preceding clause.
7. A controller for managing a computer network in a production environment, comprising: processing circuitry configured to:
   identify the endpoints to be used on the computer network during a time period; and
   at least a predetermined time prior to the commencement of the time period, the processing circuitry being configured to:
   run a flow routing algorithm for the computer network having the identified endpoints.
8. A controller according to clause 7, wherein the processing circuitry is configured to: provide an indication of the likelihood that the identified endpoints will be added to the computer network during the time period.
9. A controller according to clause 8, wherein the indication is based on the type of programme being produced in the studio or the identity of the producer of the programme.
10. A controller according to any one of clauses 7 to 9, wherein the processing circuitry is configured to: select the identified endpoints based upon the predetermined time.
11. A controller according to any one of clauses 7 to 10, wherein the processing circuitry is configured to: partition the time period into a plurality of sections during which the routes will not be rearranged.

The invention claimed is:

1. A method of managing a computer network in a production environment, comprising:
   identifying particular endpoints to be used on the computer network during a time period; and
   at least a predetermined time prior to commencement of the time period, running a flow routing algorithm for the computer network and applying the flow routing algorithm only to the identified particular endpoints,
   wherein identifying the particular endpoints to be used on the computer network during the time period includes excluding endpoints that are unused on the computer network during the time period, and
   wherein the identifying takes into account a schedule of use of the particular endpoints.

2. The method according to claim 1, comprising: providing an indication of a likelihood that the identified particular endpoints will be added to the computer network during the time period.

3. The method according to claim 2, wherein the indication is based on a type of programme being produced in a studio or an identity of a producer of the programme.

4. The method according to claim 1, comprising: selecting the identified particular endpoints based upon the predetermined time prior to commencement.

5. The method according to claim 1, comprising: partitioning the time period into a plurality of sections during which routes will not be rearranged.

6. A non-transitory computer readable medium having stored thereon a computer program comprising computer readable instructions which, when loaded onto a computer, configures the computer to perform a method according to claim 1.

7. The method according to claim 1, wherein the time period is a time when a recording studio is operational.

8. The method according to claim 1, wherein identifying the particular endpoints to be used on the computer network during the time period includes including endpoints that are optional on the computer network during the time period.

9. The method according to claim 8, wherein identifying the particular endpoints to be used on the computer network during the time period includes including endpoints that are optional on the computer network during the time period based on a prioritization determined based on likelihood of the optional endpoint being included on the network during the time period.

10. A controller for managing a computer network in a production environment, comprising:
processing circuitry configured to:
identify particular endpoints to be used on the computer network during a time period; and
at least a predetermined time prior to commencement of the time period, run a flow routing algorithm for the computer network and applying the flow routing algorithm only to the identified particular endpoints,
wherein identifying the particular endpoints to be used on the computer network during the time period includes excluding endpoints that are unused on the computer network during the time period, and
wherein the identifying takes into account a schedule of use of the particular endpoints.

11. The controller according to claim 10, wherein the processing circuitry is configured to: provide an indication of a likelihood that the identified particular endpoints will be added to the computer network during the time period.

12. The controller according to claim 11, wherein the indication is based on a type of programme being produced in a studio or a identity of a producer of the programme.

13. The controller according to claim 10, wherein the processing circuitry is configured to: select the identified particular endpoints based upon the predetermined time prior to commencement.

14. The controller according to claim 10, wherein the processing circuitry is configured to: partition the time period into a plurality of sections during which routes will not be rearranged.

* * * * *